United States Patent
Fontana

(10) Patent No.: US 9,488,272 B2
(45) Date of Patent: Nov. 8, 2016

(54) LOCKING MECHANISM FOR A REVERSE SHIFT RAIL OF A TRANSMISSION

(71) Applicant: Eaton Corporation, Cleveland, OH (US)

(72) Inventor: Carlos Fontana, Itatiba (BR)

(73) Assignee: Eaton Corporation, Cleveland, OH (US)

( * ) Notice: Subject to any disclaimer, the term of this patent is extended or adjusted under 35 U.S.C. 154(b) by 379 days.

(21) Appl. No.: 14/109,477

(22) Filed: Dec. 17, 2013

(65) Prior Publication Data

US 2014/0165765 A1 Jun. 19, 2014

Related U.S. Application Data

(63) Continuation of application No. PCT/US2013/075063, filed on Dec. 13, 2013.

(60) Provisional application No. 61/736,761, filed on Dec. 13, 2012.

(51) Int. Cl.
*B60K 20/00* (2006.01)
*G05G 5/00* (2006.01)
(Continued)

(52) U.S. Cl.
CPC ............ *F16H 63/302* (2013.01); *F16H 61/18* (2013.01); *F16H 2061/185* (2013.01); *Y10T 74/20091* (2015.01)

(58) Field of Classification Search
CPC .. F16H 61/18; F16H 2061/185; F16H 63/34; F16H 63/36
See application file for complete search history.

(56) References Cited

U.S. PATENT DOCUMENTS 3,533,301 A * 10/1970 Hausinger ............... F16H 61/18
  74/473.21
3,933,057 A * 1/1976 Tsuzuki .................. F16H 61/18
  74/473.22
4,572,020 A * 2/1986 Katayama ............... F16H 3/385
  192/218
4,638,678 A * 1/1987 Gorman .................. F16H 61/18
  74/473.22

(Continued)

FOREIGN PATENT DOCUMENTS

DE  19831066 A1  1/2000
JP  H07224933     8/1995

OTHER PUBLICATIONS

International Search Report for PCT/US2013/075063 dated Jun. 12, 2014.
(Continued)

*Primary Examiner* — William Kelleher
*Assistant Examiner* — Jake Cook
(74) *Attorney, Agent, or Firm* — Fishman Stewart PLLC

(57) ABSTRACT

An exemplary transmission may have a reverse shift rail and a locking mechanism to ensure that the reverse shift rail stops in a neutral position when disengaging from the other gear range. The reverse shift rail may be configured to move axially in a first direction to place the transmission in a drive gear, and in a second direction for a reverse gear. The transmission may also include a rail selector configured to engage with the reverse shift rail, and a reverse inhibitor configured to selectively dampen the reverse shift rail from moving in the second direction. An exemplary locking mechanism may include a main body and an arm extending from the main body. When the reverse shift rail disengages from the drive gear, the arm may be configured to contact the reverse inhibitor to substantially inhibit the movement of the reverse shift rail in the second direction.

15 Claims, 2 Drawing Sheets

(51) Int. Cl.
*F16H 63/30* (2006.01)
*F16H 61/18* (2006.01)

(56) References Cited

U.S. PATENT DOCUMENTS

| | | | | |
|---|---|---|---|---|
| 4,745,824 A | * | 5/1988 | Hiraiwa | F16H 63/302 |
| | | | | 192/218 |
| 5,119,917 A | * | 6/1992 | Fujii | F16H 63/20 |
| | | | | 192/218 |
| 2012/0096972 A1 | * | 4/2012 | Retsch | F16H 61/18 |
| | | | | 74/473.36 |
| 2013/0220054 A1 | * | 8/2013 | Retsch | F16H 63/34 |
| | | | | 74/473.28 |

OTHER PUBLICATIONS

English Abstract for DE19831066A1.
English Abstract for JPH07224933A.

* cited by examiner

LOCKING MECHANISM FOR A REVERSE SHIFT RAIL OF A TRANSMISSION

CROSS-REFERENCE TO RELATED APPLICATIONS

This application is a continuation of International Application No. PCT/US2013/075063 filed Dec. 13, 2013, which claims priority based on U.S. Provisional Patent Application 61/736,761, filed Dec. 13, 2012, which are hereby incorporated by reference in their entirety.

BACKGROUND

Manual compound transmissions are generally positioned within a driveline adjacent a primary drive unit with at least one rotating drive shaft. These compound transmissions generally include a shifter or gear selector that extends from the transmission for interaction with an operator. The compound transmission may include a rotating and sliding assembly that is configured to engage a desired gear set when an operator moves the shifter or gear selector. Specifically, in a manual compound transmission, an operator, through the gear selector, selects an appropriate gear by pushing or pulling the shift lever to a desired shift gate. A rail selector fixed to the main shift rail is configured to translate the movement of the shift lever to shift forks, which causes a shift collar to slide over the appropriate rotating gear to synchronize and activate a desired gear range.

In a five-speed transmission, the reverse gear range and the fifth gear range may be activated via a common shift rail. In such transmissions, when quickly shifting from fifth gear to fourth gear, the common shift rail may still have kinetic energy, thereby moving it toward the reverse gear set. This may result in damaging the blocker ring and/or dog teeth of the transmission. Therefore, there exists a need to ensure that the common shift rail stops at the neutral position when shifting from fifth gear to fourth gear.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

An exemplary transmission, such as a five-speed transmission, may include a reverse shift rail used to place the transmission in either a reverse gear range or another drive gear range, such as fifth gear. The shift rail may be configured to move axially in a first direction for the drive gear range, and axially in a second direction for the reverse gear range.

In addition to the reverse shift rail, the exemplary transmission may include a main shift rail and a reverse inhibitor. The main shift rail may have a rail selector with a laterally extending wing configured to selectively engage with the reverse shift rail to enable the axial movement of the reverse shift rail. The reverse inhibitor may be configured to selectively dampen the reverse shift rail from moving in the second direction toward the reverse gear range when disengaging from the drive gear range.

When disengaging the transmission from the drive gear range, such as when shifting to another gear, it may be desirable to ensure that the reverse shift rail moves into a neutral position. To achieve this, the reverse shift rail may include a locking mechanism. An exemplary locking mechanism may include a main body and an arm extending from the main body. The main body may be positioned around at least a portion of the reverse shift rail, and may be operatively rotatable around the at least a portion of the reverse shift rail. The arm may be configured to engage with the wing to enable the main body to rotate from a first position. When the reverse shift rail disengages from the drive gear, the arm may be configured to come into contact with the reverse inhibitor to substantially inhibit the movement of the reverse shift rail in the second direction.

Figure 1:
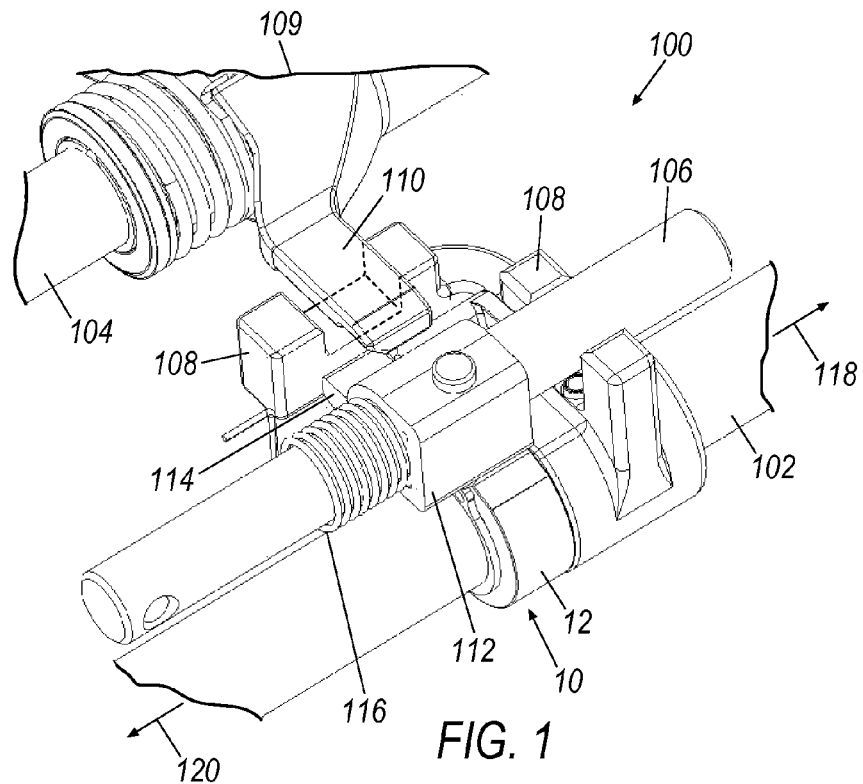
FIG. 1 is a schematic, perspective view of a portion of an exemplary transmission illustrating a reverse shift rail with an exemplary locking mechanism.
Figure 2:
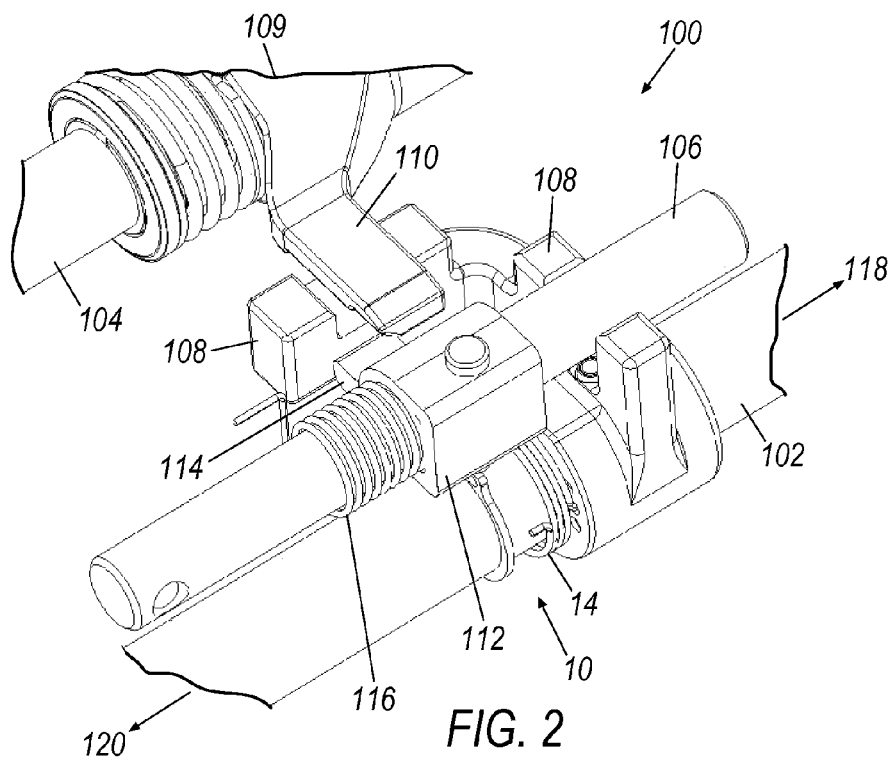
FIG. 2 is a schematic, perspective view of the reverse shift rail of FIG. 1 with a casing of the locking mechanism removed.

Referring now to FIGS. 1 and 2, a portion of a transmission 100 for a vehicle is shown. The transmission 100 generally may include a plurality of shift rails, including a reverse shift rail 102 and a main shift rail 104. The main shift rail 104 may be connected to a shifter (not shown) by which an operator of the vehicle may control the main shift rail 104 to select a desired gear range. The main shift rail 104 may move and/or rotate to engage with one of the plurality of shift rails corresponding to the desired gear range. When a gear range is not selected, the shift rails generally may be in a neutral position.

With specific reference now to the reverse shift rail 102, while it is described hereinafter as being common to the fifth gear, it should be appreciated that the reverse shift rail 102 may be common to any other gear range. The main shift rail 104 may be configured to engage with the reverse shift rail 102 and move it axially in a first direction 118 or a second direction 120 to place the transmission 100 in fifth gear or reverse, respectively. To accomplish this, the main shift rail 104 may have a rail selector 109 attached to it. The rail selector 109 may have at least one wing 110 extending laterally from it. The reverse shift rail 102 may have a shift lug 108 having an axial portion positioned substantially parallel with the reverse shift rail 102, and a transverse portion positioned substantially perpendicular to the reverse shift rail 102. The axial portion and the transverse portion each may have a pair of shoulders that form a groove. The axial portion may be configured to receive the wing 110 in the groove when it rotates with the main shift rail 104, as controlled by the shifter. When the main shift rail 104 and the rail selector 109 move in an axial direction, a side surface of the wing 110 may engage with a surface of one of the shoulders of the axial portion, thereby causing the reverse shift rail 102 to move axially with the main shift rail 104 in either the first direction 118 or the second direction 120.

The transmission 100 may also include a reverse inhibitor 112 configured to dampen the movement of the reverse shift rail 102 in the second direction 120 when disengaging from fifth gear back to the neutral position. The reverse inhibitor 112 may be rotatable around and/or slidable along an inhibitor shaft 106, and may include a tab 114 extending from it. The inhibitor shaft 106 may be aligned substantially parallel with the reverse shift rail 102, and positioned in or around the transverse portion of the shift lug 108. When the wing 110 of the rail selector 109 rotates, as explained above, it may come into contact with the tab 114, thereby causing the reverse inhibitor 112 to rotate in an opposite rotational direction. The reverse inhibitor 112 may be operatively attached to a spring 116 configured to bias the reverse inhibitor 112 back to its original position, rotationally and/or axially, when disengaged from the wing 110, as described in more detail hereinafter. In addition or alternatively, the spring 116 may be provide the dampening of the movement of the reverse shift rail 102 in the second direction.

Figure 3:
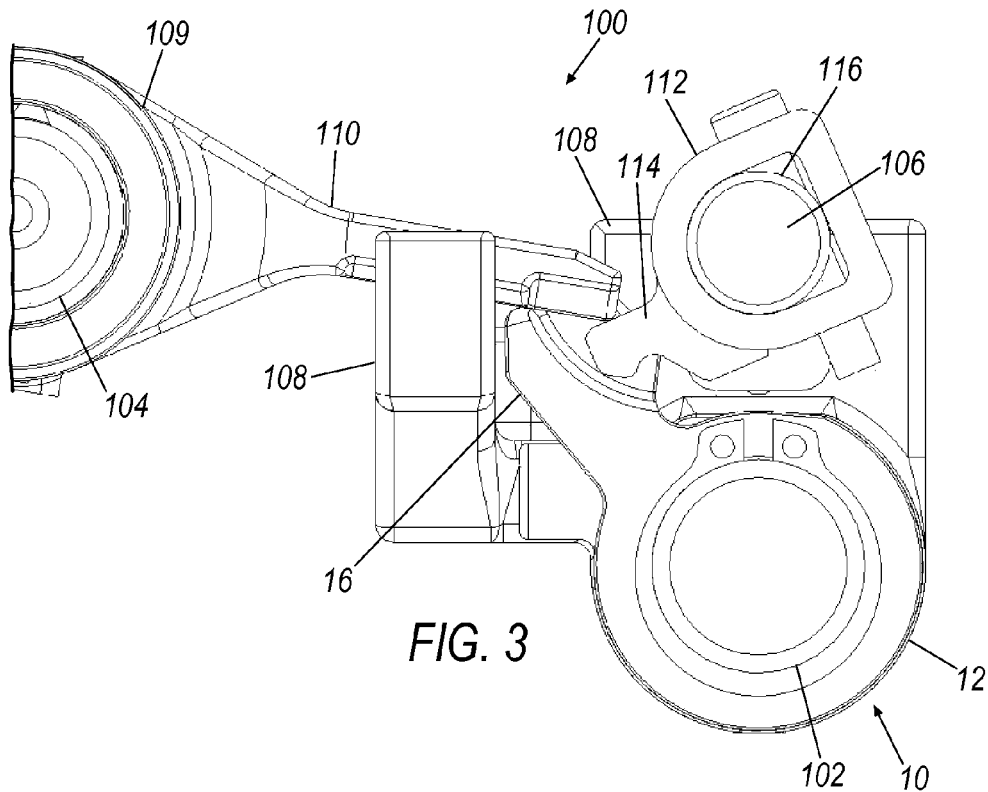
FIG. 3 is a schematic, front view illustrating the reverse shift rail in an engaged position.
Figure 4:
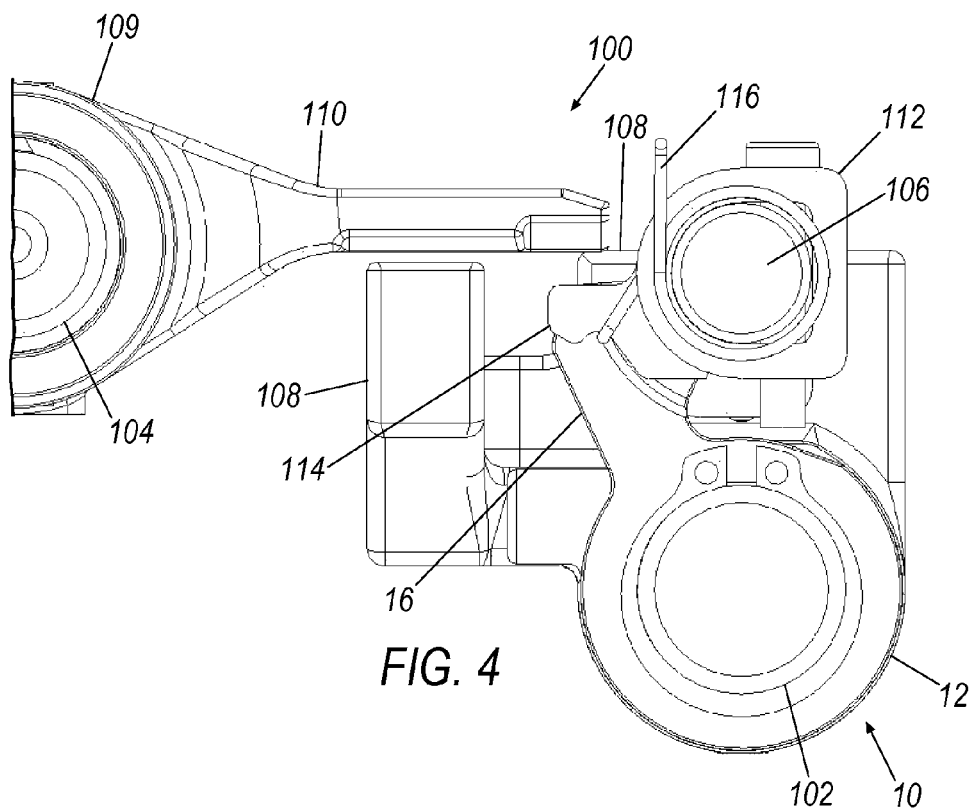
FIG. 4 is a schematic, front view illustrating the reverse shift rail in a neutral position.

Referring now to FIGS. 3 and 4, and with continuing reference to FIGS. 1 and 2, the reverse shift rail 104 may include a locking mechanism 10 configured to stop the reverse shift rail 102 in a neutral position when disengaging from the fifth gear. The locking mechanism 10 generally may include a main body 12 disposed around a portion of the reverse shift rail 102, and an arm 16 extending from the main body 12. The arm 16 may be configured to engage with the wing 110 of the rail selector 109 to initiate the rotational movement of the locking mechanism 10, as seen in FIG .3. This may in turn enable the axial movement of the reverse shift rail 102. When the reverse shift rail 102 is in the neutral position, as seen in FIG. 4, the arm 16 may extend at an angle toward the general direction of the wing 110, and may be positioned between the transverse portion of the shift lug 108 and the tab 114 of the reverse inhibitor 112. The locking mechanism 10 may include a spring 14, as seen in FIG. 2, operatively attached to the main body 12. The spring 14 may be configured to bias the main body 12 to its original position when the wing 110 disengages from the arm 16 and the reverse shift rail 102 is in the neutral position.

When selecting fifth gear, the wing 110 first rotates until it is firmly engaged with the axial portion of the shift lug 108. The wing 110 may also engage both the tab 114 and the arm 16, causing them to rotate around the inhibitor shaft 106 and the reverse shift rail 102, respectively, as seen in FIG. 3 and explained above. The main shift rail 104 may then move the reverse shift rail 102 axially in the first direction 118 via the shift lug 108. In doing so, the wing 110 may become disengaged with the tab 114, as the reverse inhibitor 112 and the inhibitor shaft 106 may remain substantially stationary with respect to the axial movement of the reverse shift rail 102. The reverse inhibitor 112 may then rotate back to its original position. The locking mechanism 10 may remain in contact with the wing 110 and in the rotated position.

When disengaging from fifth gear, the main shift rail 104 may move the reverse shift rail 102 via the wing 110 and the shift lug 108 in the second direction 120 back toward the neutral position. When back in the neutral position, the main shift rail 104 may rotate such that the wing 110 disengages from the shift lug 108 and the arm 16 of the locking mechanism 10. The main body 12 may then rotate back to its original rotational position via the spring 14. The reverse shift rail 102 may still have some kinetic energy in the second direction 120. To prevent the reverse shift rail 102 from continuing to move in the second direction 120 and potentially and undesirably engaging the reverse gear range, the arm 16 may come into contact with the tab 114.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A transmission, comprising:
   a reverse shift rail of a transmission configured to move axially in a first direction from a neutral position to activate a drive gear range, and in a second direction from the neutral position to activate a reverse gear range;
   a main shaft rail aligned substantially parallel to the reverse shift rail and configured to move in an axial direction and to rotate about an axis;
   a rail selector on the main shaft rail and having a wing configured to engage with the reverse shift rail, and a reverse inhibitor configured to selectively dampen the reverse shift rail from moving in the second direction; and
   a locking mechanism comprising:
      a main body positionable and operatively rotatable around at least a portion of the reverse shift rail, and
      an arm extending from the main body, the arm being configured to engage with the wing to enable the main body to rotate from a first position,
      wherein the arm is configured to come into contact with the reverse inhibitor when the reverse shift rail disengages from the drive gear range to the neutral position.

2. The transmission of claim 1 further comprising a spring operatively attached to the main body, the spring being configured to bias the main body to the first position.

3. The transmission of claim 2 wherein the spring is positionable between the main body and the reverse shift rail.

4. The transmission of claim 2 wherein the spring is a torsion spring.

5. The transmission of claim 1 wherein the reverse shift rail has a shift lug having an axial portion aligned substantially parallel to the reverse shift rail, and a transverse portion aligned substantially perpendicular to the reverse shift rail, and wherein the arm is positionable between the reverse inhibitor and the transverse portion of the shift lug in the neutral position.

6. The transmission of claim 1 wherein the reverse inhibitor has a tabbed extension, the arm being configured to engage with the tabbed extension to selectively inhibit axial movement of the reverse shift rail in the second direction.

7. A transmission comprising:
   a reverse shift rail configured to move axially in a first direction from a neutral position to activate a drive gear range, and in a second direction from the neutral position to activate a reverse gear range;
   a main shift rail aligned substantially parallel to the reverse shift rail and being configured to move in an axial direction and to rotate around an axis, the main shift rail having a rail selector with a laterally extending wing configured to selectively engage with the reverse shift rail to enable the axial movement of the reverse shift rail;
   a reverse inhibitor configured to selectively dampen the reverse shift rail from moving in the second direction; and
   a locking mechanism having:
      a main body disposed around and operatively rotatable around at least a portion of the reverse shift rail; and
      an arm extending from the main body, the arm being configured to engage with the wing to enable the main body to rotate from an original position;
   wherein the arm is configured to come into contact with the reverse inhibitor when the reverse shift rail disengages from the drive gear range to the neutral position.

8. The transmission of claim 7 wherein the drive gear range is fifth gear.

9. The transmission of claim 7 further comprising a spring operatively attached to the main body, the spring being configured to bias the main body to the original position.

10. The transmission of claim 9 wherein the spring is positioned between the main body and the reverse shift rail.

11. The transmission of claim 9 wherein the spring is a torsional spring.

12. The transmission of claim 7 wherein the reverse shift rail has a shift lug having an axial portion aligned substantially parallel to the reverse shift rail, and a transverse portion aligned substantially perpendicular to the reverse shift rail, the axial portion being configured to receive the laterally extending wing of the rail selector.

13. The transmission of claim 12 wherein the arm is positioned between the reverse inhibitor and the transverse portion of the shift lug in the neutral position.

14. The transmission of claim 12 further comprising an inhibitor shaft aligned substantially parallel with the reverse shift rail and positioned within the transverse portion of the shift lug, the reverse inhibitor being disposed around and rotatable around the inhibitor shaft.

15. The transmission of claim 7 wherein the reverse inhibitor has a tabbed extension configured to engage with the arm of the locking mechanism to selectively inhibit axial movement of the reverse shift rail in the second direction.

* * * * *